Dec. 4, 1956 H. N. SHAW 2,772,978
FRY KETTLES WITH FLOATING COVERS
Filed Sept. 26, 1950 3 Sheets-Sheet 1
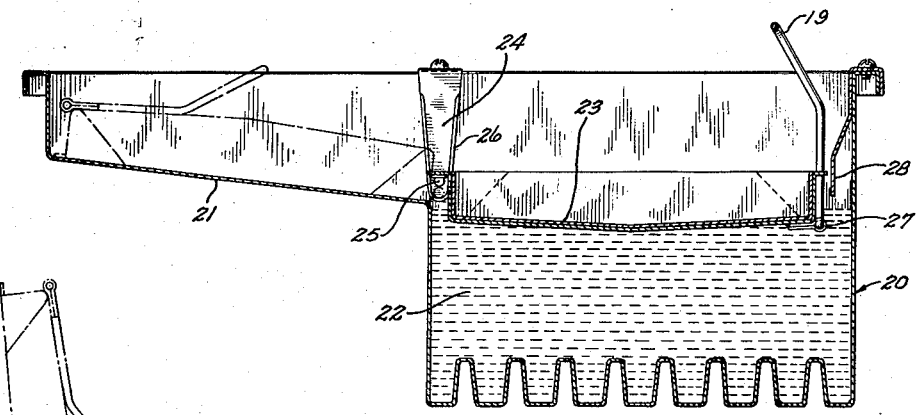
Fig. 1.
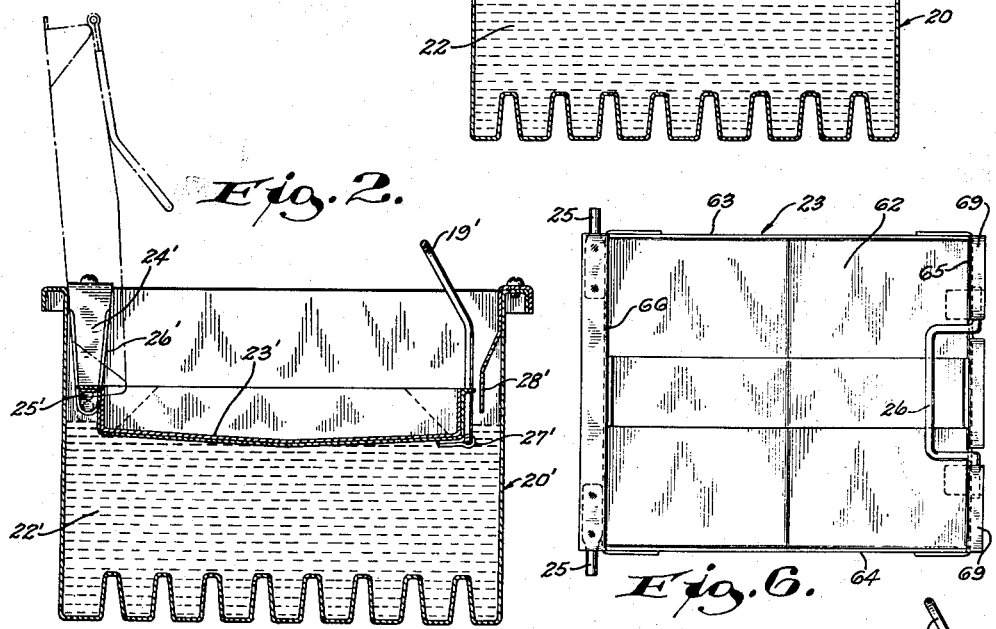
Fig. 2.
Fig. 6.
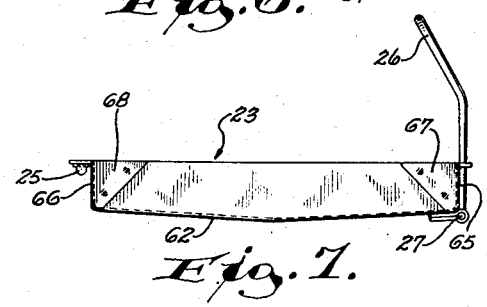
Fig. 7.
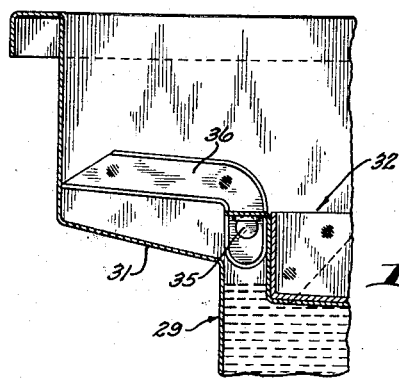
Fig. 8.
INVENTOR.
Harold N. Shaw
BY
Morrell & Morrell
ATTORNEYS.

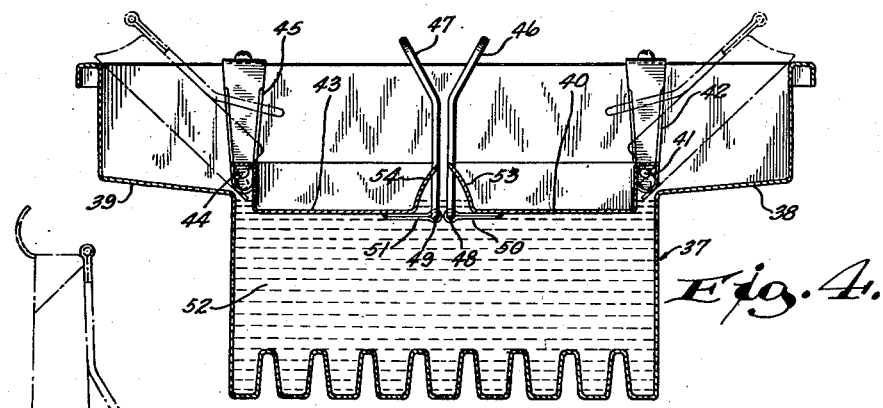
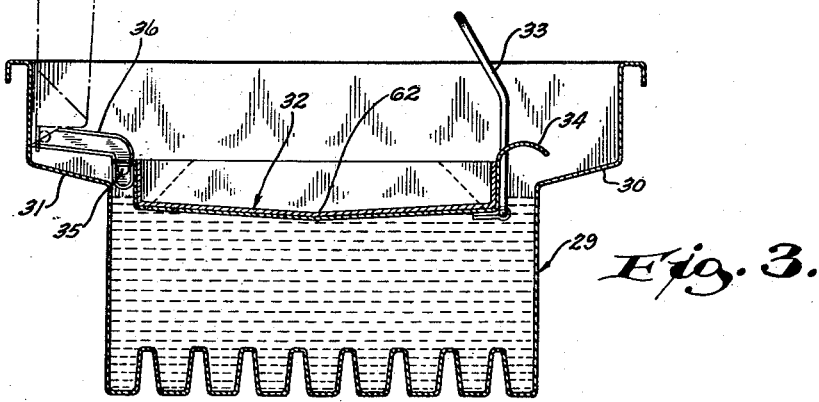
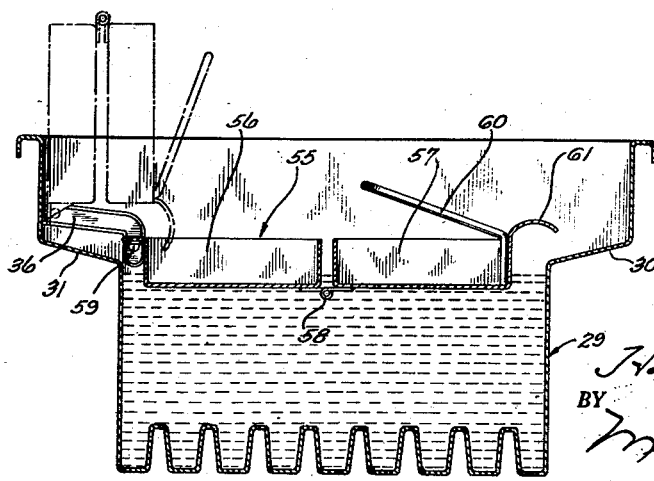
INVENTOR.
Harold N. Shaw
BY
ATTORNEYS.

Dec. 4, 1956 H. N. SHAW 2,772,978
FRY KETTLES WITH FLOATING COVERS
Filed Sept. 26, 1950 3 Sheets-Sheet 3
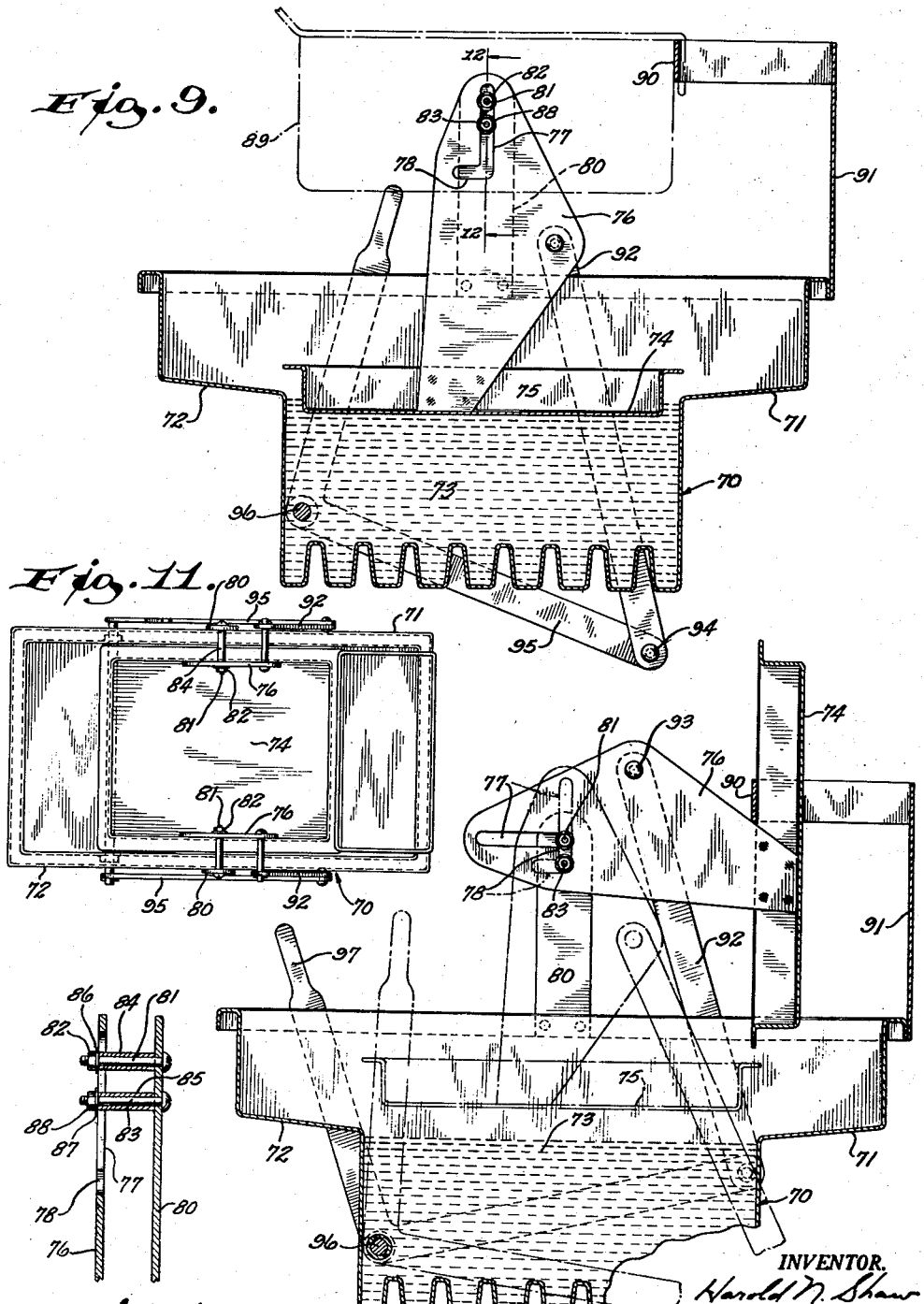

United States Patent Office 2,772,978
Patented Dec. 4, 1956

2,772,978

FRY KETTLES WITH FLOATING COVERS

Harold N. Shaw, Erie, Pa.

Application September 26, 1950, Serial No. 186,734

18 Claims. (Cl. 99—163)

This invention relates to improvements in fry kettles and more particularly, but not exclusively, to kettles of the type shown in my Patent No. 2,360,727 in which a relatively shallow bath of the cooking fat is used.

In ordinary usage the fat in a fry kettle breaks down and has to be discarded after a few days' time. This is particularly true in short order restaurants where the fry kettle has to be kept hot almost continuously. In such restaurants, however, the fat is used for actual cooking only a small percentage of the time and such a situation is, therefore, wasteful. Tests which have been made in connection with the development of present invention indicate that most of the breakdown of the fat occurs at the surface where the hot fat comes in contact with the air.

It is, therefore, a general object of the present invention to provide means operable during periods when no cooking is being done for preventing the hot fat at the surface from coming into contact with the air, thereby making it possible to maintain the fat in a satisfactory cooking condition indefinitely.

A more specific object of the invention is to accomplish the above purpose by means of a floating pan which is shaped to substantially cover the surface of the fat in the fry kettle.

A further object of the invention is to provide means for conveniently and safely moving the floating cover into and out of covering position so as to make it easy for the restaurant cook to make use of the cover with the consequent substantial saving in the cost of fat to the restaurant owner.

A further object of the invention is to provide in a fry kettle having a floating cover as above described, means for supporting the cover in floating position while permitting it to adjust itself to changes in the level of the fat.

A further, more specific object is to provide a cover for fry kettles wherein the cover is hingedly supported in a novel manner to facilitate movement into and out of covering position.

A further object of the invention is to provide a construction as above described including articulated levers for causing movement of the cover.

A still further object of the invention is to provide in a fry kettle having a floating cover, means for preventing upward splashing of fat when the cover is lowered.

A further object of the invention is to provide a fry kettle having a floating cover wherein the bottom of the cover is so formed as to eliminate the possibility of air pockets under the cover.

A further object is to provide in one form of the invention having an externally operable cover moving means, an operating arrangement wherein there is no interference, when the cover is up, with the lowering of the basket into the fat, and no interference with the engaging of the basket with the usual hanger at the back of the fry kettle; and to provide an arrangement where the basket does not interfere with the use of the cover.

With the above and other objects in view, the invention consists of the improved fry kettle, and all of its parts and combinations, as set forth in the claims, and all equivalents thereof.

In the accompanying drawings illustrating several embodiments of the invention:

Fig. 1 is a vertical longitudinal sectional view through a kettle, of the type having an extended ledge on one side, showing one form of the improved cover in fat covering position, the dot and dash lines illustrating the cover in an out of the way position for cooking;

Fig. 2 is a similar view showing the use of the cover on a straight sided kettle;

Fig. 3 is a vertical sectional view through a kettle, of the type having a flared top, illustrating one form of floating hinge for the cover, the dot and dash lines illustrating the cover in an out of the way position for cooking;

Fig. 4 is a similar view to Fig. 3 also showing a flared kettle wherein a double cover is used, there being a floating hinge for each section of the double cover, and the dot and dash lines illustrating the covers in raised position;

Fig. 5 is a view similar to Fig. 3 showing a double folding cover with the same type of floating hinge as is employed in Fig. 3, the dot and dash lines illustrating the raised position of the cover sections;

Fig. 6 is a top view of a typical cover such as is used in the form of the invention of Fig. 2;

Fig. 7 is a side view of the cover of Fig. 6;

Fig. 8 is an enlarged fragmentary vertical sectional view showing the details of the floating hinge of the type employed in Fig. 3;

Fig. 9 is a vertical sectional view through a flared type of fry kettle showing an externally operated type of floating cover, the dot and dash lines showing a fry basket supported in customary position above the kettle, when the kettle is not being used, and the cover being in fat covering position;

Fig. 10 is a view similar to Fig. 9 showing the cover in a fully raised position, the dot and dash lines illustrating an intermediate position of the cover during the raising operation;

Fig. 11 is a top view, on a reduced scale, showing the structure of Fig. 9; and

Fig. 12 is a detail sectional view taken on the line 12—12 of Fig. 9.

Referring more particularly to the drawings, the kettles illustrated all have corrugated bottom heating surfaces similar to the kettle shown in my Patent No. 2,360,727, issued October 17, 1944. However, the present invention is applicable to any other type of fry kettle having any type of gas or electric heat.

Referring first to Fig. 1, the numeral 20 designates a fry kettle having a lateral extension 21 forming a ledge for receiving foam which might overflow from the body of fat 22. Pivotally mounted on the kettle, in a position where it can float on the fat 22, is a floating cover 23 which preferably has the shape of an open topped pan. The cover may be pivotally connected to the kettle in any desired manner. In Fig. 1 opposite side walls of the kettle are equipped with hinge pin guides 24 for receiving the ends of hinge pins or trunnions 25. Each guide is equipped with a U-shaped inwardly projecting flange 26, whereby the vertical position of the pan may adjust itself to suit the level of the liquid 22. The floating mounting for the hinge pins 25 also permits swinging movement of the cover from the full line position of Fig. 1 to the dot and dash line position therein. The latter position is employed when food is being cooked. To facilitate moving the cover to the dot and dash line position, a handle 19 is provided, which handle may be pivotally connected to the cover as at 27.

In order to prevent dangerous splashing of hot fat if the cover should be dropped suddenly onto the liquid, a splash guard 28 may be provided adjacent the front of the kettle. In this form of the invention the ledge 21 is long enough to accommodate the cover when the latter is swung to the dot and dash line position of Fig. 1.

Fig. 2 shows the adaptation of the structure of Fig. 1 to a straight sided kettle. Aside from the difference in the shape of the kettle, all of the parts are identical to the corresponding parts of Fig. 1 and the same numerals are employed. In this form of the invention the cover 23' may be swung on its hinge pin 25' only to the dot and dash line position of Fig. 2 as the rear wall prevents further movement. This dot and dash line position is the position which is used when cooking is being performed.

In the form of the invention of Fig. 3, the kettle 29 has a flared top to provide a front foam ledge 30 and a rear foam ledge 31. In this form of the invention the floating cover 32 is similar to the cover 23 and has a handle 33 which is pivoted to the front of the cover, as illustrated. The hinge pins 35 have their ends received in L-shaped guides 36, which guides permit vertical floating movement of the cover to adjust itself to the level of the liquid and also permit a hinging and sliding movement of the cover to the dot and dash line position shown in Fig. 3. The latter position is used during a cooking operation.

In order to provide a splash guard, the forward wall of the cover 32 is curved upwardly and forwardly as at 34. Thus, should the cover be lowered too suddenly, any splashing fat will be intercepted by the guard 34.

In the form of the invention of Fig. 4, the kettle 37 also has a front foam ledge 38 and a rear foam ledge 39. In this view a double cover is illustrated. One cover section 40 has the ends of its hinge pins 41 received in guides 42. The other cover 43 has the ends of its hinge pins 44 received in guides 45. Each cover has its front edge equipped with a handle 46 and 47, which handles are pivoted, as at 48 and 49, to brackets 50 and 51 respectively. The covers may be moved by lifting the handles 46 and 47 from the full line position, where they cover the fat 52 to the dot and dash line positions shown in Fig. 4. It is to be noted that the meeting front walls of the cover sections 40 and 43 are scow-shaped as at 53 and 54 to cooperate in producing a trap therebetween which minimizes the possibility of any fat splashing out of the kettle to endanger the cook if the covers are lowered suddenly.

In Fig. 5 a kettle is illustrated which is the same as the kettle of Fig. 3 and the same reference numerals are, therefore, employed. A different cover, however, is used. This cover, which is designated generally by the numeral 55, has two sections 56 and 57 which are hinged together as at 58. At the rear edge of the section 56 there are hinge pins 59 whose ends coact with the guideways 36. At the front of the section 57 there may be an operating handle 60 as well as a splash guard 61. When cooking is to be performed, the cover is lifted upwardly through use of the handle 60 causing it to double over on the hinge 58. It is then slid rearwardly in the guides 36 to the dot and dash line position illustrated.

The type of cover which it is preferred to employ and which is shown at 23 in Fig. 1 and at 32 in Fig. 3, is illustrated in detail in Figs. 6 and 7. In this type of cover it is preferred to have a bottom wall which is dished as at 62 and also braced as illustrated. The side walls 63 and 64 may be bent upwardly from the bottom wall, and the front wall 65 and rear wall 66 may likewise be bent upwardly to form corner tabs 67 and 68 which may be folded around the corners and spot welded or otherwise secured in position. Folded corner tabs of this type avoid corner joints and make a lightweight cover of thin metal practical.

The upper edge of the rear wall 66 may have an outwardly directed flange to support the hinge pins 25 which may be welded or otherwise secured in position as shown. The front wall may also be provided with outwardly directed flanges 69, which flanges are longitudinally spaced apart to provide room for the handle 26.

In view of the fact that in many cases it is desirable to have a cover which may be operated from a position externally of the kettle, the form of the invention shown in Figs. 9 to 12 inclusive is shown. In this form of the invention there is a kettle 70 having a flared top to provide a front ledge 71 and a rear ledge 72. The kettle is adapted to contain fat 73 on which a floating cover 74 is adapted to rest when the kettle is not in use. Welded or otherwise secured to each of the side walls 75 of the cover is an upstanding substantially triangular plate 76. Each plate has a vertical slot 77 near its upper end, and at the bottom of the slot is an extension 78 which projects laterally to form an L-shaped slot.

Welded or otherwise secured to each of the opposite side walls of the kettle is an upstanding plate 80. Bolts 81 which project inwardly from the upper ends of the plates 80 extend through the slot 77 of the plate 76 and may have nuts 82 on their inner ends. Sleeves 84 may be positioned on the bolts 81, as shown. Below each of the bolts 81 is another bolt 83 which bolts extend through the slots 77 and may have nuts 88 on their inner ends. Sleeves 85 may be positioned on the bolts 83, as shown. In addition to the above, washers 86 and 87 which overlap the slots 77 are employed on the ends of the bolts adjacent the nuts thereon.

The above construction is such that an upward force exerted on the plates 76 will cause the plates to first move straight upwardly, the sleeves 84 and 85 sliding in the slots 77. This will, of course, cause a lifting of the cover 75 out of the fat to the dot and dash line position of Fig. 10. After the parts have reached the position of Fig. 10, further movement of the plates 76 will cause a pivoting on the sleeves 84, with the sleeves 85 positioned in the lateral extensions 78 of the slots 77. Thus the triangular plates 76 will swing from the dot and dash line position of Fig. 10 to the full line position therein to cause swinging of the cover to the full line vertical position, which position is at right angles to its dot and dash line position. While in this position, the cover is entirely out of the way and there is no interference with the hanging of the fry basket 89 (as in Fig. 9) and there is no interference with the cooking operation. Thus the fry basket may be freely moved into and out of the fat without interfering with the cover 75, when the latter is in its full line position of Fig. 10 and also, when the fry basket is in its supported position of Fig. 9, the cover may be freely moved from the position of Fig. 9 to either of the positions of Fig. 10 without interference from the basket.

The particular operating arrangement, which first causes a straight lifting of the cover and then a turning, is desirable because the cover must be first lifted clear of the fat before it is turned to vertical position in order to prevent the edge from dipping under the fat during turning.

Figs. 9 and 10 illustrate a bar 90 forming a hook with which the basket 89 may be engaged when the basket is in the position of Fig. 9 out of the fat. These Figures also show the use of a back splash plate 91 which is desirable. The cross bar 90, on which the basket is adapted to be hung, also forms a stop to limit swinging movement of the cover to the full line position of Fig. 10.

Any suitable mechanism may be employed to impart movement to the plates 76. In the form of invention illustrated there are lift bars 92 which are pivotally connected at their upper ends to the plates 76 as at 93. The lower ends of the lift bars are pivotally connected as at 94 to the ends of arms 95. The opposite ends of the arms 95 are pivotally movable on a cross shaft 96 which may extend through a tube 96' in the kettle as shown. Rigidly connected to one of the cross arms may be any form of operating device capable of causing movement of the arms 95 on the pivots 96. In the form of the invention illustrated a simple hand lever 97 is shown.

It is apparent that movement of the lever 97 from the full line position of Fig. 9 to the full line position of Fig. 10 causes movement of the cover 74 from the full line position of Fig. 9 to the full line position of Fig. 10 with but one motion of the lever.

Various changes and modifications may be made without departing from the spirit of the invention, and all of such changes are contemplated as may come within the scope of the claims.

What I claim as new is:

1. In a fry kettle having a fat receiving portion, a cover of a size to fit within said fat receiving portion, cooperating connection means on the cover and kettle movably mounting said cover in a position where it may contact the body of fat within the kettle, and said connection means providing for movement of the cover to an alternative position where the fat is accessible for cooking, and a guard fixed to the front of the fat receiving portion of the kettle and projecting inwardly above the normal surface level of the fat to minimize the possibility of fat splashing out of the front of the kettle when the cover is lowered.

2. In a fry kettle having a fat receiving portion, a cover of a size to fit within said fat receiving portion, cooperating connection means on the cover and kettle movably mounting said cover in a position where it may float on the body of fat within the kettle, said connection means including a connection to provide for vertical movement of the cover to adapt itself to changes in the level of the fat, and said connection means providing for movement of the cover to an alternative position where the fat is accessible for cooking, and a handle pivoted to a lower forward portion of the cover and adapted to project upwardly when the cover is in fat covering position.

3. In a fry kettle having a fat receiving portion, a cover of a size to fit within said fat receiving portion and having hinge pins projecting laterally from opposite portions thereof, hinge pin sockets on opposite side walls of the kettle positioned to provide for floating of the cover on the body of fat within the kettle when the pins are in said sockets, said sockets having upright guiding portions which permit vertical movement of the cover to adapt itself to changes in the level of the fat.

4. In a fry kettle having a fat receiving portion, a cover of a size to fit within said fat receiving portion and having hinge pins projecting laterally from opposite portions thereof, hinge pin sockets on opposite side walls of the kettle positioned to provide for floating of the cover on the body of fat within the kettle when the pins are in said sockets, said sockets having upright guiding portions to provide for vertical movement of the cover to adapt itself to changes in the level of the fat and said sockets having laterally extending guiding portions communicating with said upright guiding portions to provide for sliding movement of the cover relative to the kettle after the pins have been moved upwardly in the upright guiding portions.

5. In a fry kettle having a fat receiving portion, a cover of a size to fit within said fat receiving portion, plates projecting upwardly from opposite sides of the cover, supports projecting upwardly from corresponding sides of the kettle, each support having pivot pins projecting inwardly therefrom, said plates having guiding slots for receiving said pivot pins which slots are each formed with a lateral extension to receive one of said pivot pins and permit swinging movement of the plates and cover only after elevating movement has first taken place.

6. In a fry kettle having a fat receiving portion, a cover of a size to fit within said fat receiving portion, plates projecting upwardly from opposite sides of the cover, supports projecting upwardly from corresponding sides of the kettle, each support having upper and lower pivot pins projecting inwardly therefrom, said plates having guiding slots for receiving said pivot pins which slots are formed with lateral extensions to receive the lower pivot pins and permit swinging movement of the plates and cover only after elevating movement has first taken place, a bar pivoted at one end to each of said plates, a cross bar pivoted at one end to the opposite end of each of said first mentioned bars, the opposite ends of said cross bars being pivoted to the kettle on a common axis, and manually operable means for swinging said cross bars on the kettle pivots.

7. In a fry kettle having a fat receiving portion, a cover of a size to fit within said fat receiving portion, plates projecting upwardly from opposite sides of the cover, supports projecting upwardly from corresponding sides of the kettle, each support having upper and lower pivot pins projecting inwardly therefrom, said plates having guiding slots for receiving said pivot pins which slots are L-shaped to coact with said pins in permitting swinging movement of the plates and cover on the upper pins only after elevating movement has first taken place.

8. In a fry kettle having a fat receiving portion, a cover of a size to fit within said fat receiving portion to rest on and substantially cover fat therein, plates projecting upwardly from opposite sides of the cover, supports projecting upwardly from corresponding sides of the kettle and having pivot pins projecting inwardly therefrom, said plates having guiding slots for receiving said pivot pins which slots are so shaped and so coact with the pins as to provide for swinging movement of the cover to a cooking position at right angles to its fat covering position only after elevating movement has first taken place, the plates being of such length and the slots being so positioned that the cover is substantially clear of the fat receiving portion of the kettle when in said cooking position.

9. In a fry kettle having a fat receiving portion, a cover of a size to fit within said fat receiving portion, extensions projecting upwardly from opposite sides of the cover, extensions projecting upwardly from corresponding sides of the kettle, one set of said extensions having pivot means projecting laterally therefrom and the other set of extensions having guiding slots for receiving said pivot means, which slots are formed with lateral extensions to also receive said pivot means and permit swinging movement of the cover and its extensions only after elevating movement has first taken place.

10. In a fry kettle having a fat receiving portion, a cover of a size to fit within said fat receiving portion to rest on and substantially cover the fat therein, extensions projecting upwardly from opposite sides of the cover, extensions projecting upwardly from corresponding sides of the kettle, one set of said extensions having pivot means projecting laterally therefrom and the other set of said extensions having guiding slots for receiving said pivot means which slots are so shaped and so coact with the pivot means as to provide for swinging movement of the cover to a cooking position at right angles to its fat covering position only after elevating movement has first taken place, the extensions being of such length and the slots being so positioned that the cover is substantially clear of the fat receiving portion of the kettle when in said cooking position.

11. In a fry kettle having a fat receiving portion, a movable cover of a size to fit within said fat receiving portion while in a generally horizontal position to contact the fat therein, mechanism for elevating said cover out of said fat receiving portion and including means for shifting said moving cover to a generally upright position where it is supported edgewise in a position offset from said fat receiving portion to leave the latter clear for the insertion or removal of a French frying basket, and drip receiving means positioned to be below and receive the drippings from the cover when the latter is in its elevated offset position.

12. In a fry kettle having a fat receiving portion, a movable cover of a size to fit within said fat receiving portion while in a generally horizontal position to contact the fat therein, mechanism for elevating said cover out of said fat receiving portion and including means for shifting said moving cover to a generally upright position where it is supported edgewise in a position offset from said fat receiving portion to leave the latter clear for the insertion or removal of a French frying basket, there being drip receiving means overhanging an edge of said kettle and positioned to be below and receive the drippings from the cover when the latter is in its elevated offset position, said drip receiving means being inclined to direct drppings from the cover back into the fat receiving portion.

13. In a fry kettle having a fat receiving portion and having an offset drip receiving portion, a movable cover of a size to fit within said fat receiving portion while in a generally horizontal position to float on the fat therein, mechanism for elevating said cover out of said fat receiving portion and including means for shifting said cover to a generally upright position and for guiding it to a position where it is supported edgewise over said offset drip receiving portion of the kettle to drain thereon leaving the fat receiving portion of the kettle clear for the insertion and removal of a French frying basket.

14. In a fry kettle having a fat receiving portion and having an offset portion, a movable cover of a size to fit within said fat receiving portion while in a generally horizontal position to contact the fat therein, and means for guiding said cover to an offset position where it is disposed over said offset portion to drain thereon leaving the fat receiving portion of the kettle clear for the insertion and removal of a French frying basket.

15. In a fry kettle having a fat receiving portion and having an offset portion which is inclined to direct drippings back into said fat receiving portion, a cover of a size to fit within said fat receiving portion while in a generally horizontal position to contact the fat therein, and means for causing movement of said cover out of said fat receiving portion, there being guiding means connected to the kettle to cause swinging of the moving cover to a generally upright position where it hangs edgewise over said offset portion leaving the fat receiving portion of the kettle clear for the insertion and removal of a French frying basket.

16. In a fry kettle having a fat receiving portion, a cover of a size to fit within said fat receiving portion while in a generally horizontal position to float on the fat therein, extensions projecting upwardly from opposite sides of the cover, extensions projecting upwardly from corresponding sides of the kettle, and means for moving the cover out of the fat receiving portion, there being cooperating means on said extensions for causing said moving cover to be swung to a position where it hangs edgewise in a location to leave said fat receiving portion of the kettle substantially clear for the insertion and removal of a French frying basket.

17. In a fry kettle having a fat receiving portion, a cover of a size to fit within said fat receiving portion to substantially cover the latter, cooperating means on the cover and kettle movably mounting said cover in a position where it may float on the body of fat within the kettle, said cooperating means including a connection to provide for vertical movement of the cover to adapt itself to changes in the level of the fat, and said cooperating means providing for movement of the cover to and from fat covering position, said cover having upstanding sides and a downwardly dished bottom, and said bottom comprising areas which incline upwardly toward the sides of the cover to allow the escape of air as the cover is being moved into the fat.

18. A method of maintaining fat in proper cooking condition in a fry kettle comprising applying heat to the bottom portion of the kettle to keep the fat continuously hot, and protecting the fat against surface oxidation by placing a cover directly in the fat to contact substantially the entire top surface thereof during intervals when the fat is not being used and while heat is still being applied to the bottom portion thereof.

References Cited in the file of this patent

UNITED STATES PATENTS

| | | |
|---|---|---|
| 493,145 | Ames | Mar. 7, 1893 |
| 1,068,854 | Carden | July 29, 1913 |
| 1,275,611 | Schwab | Aug. 13, 1918 |
| 1,371,718 | Zimmermann | Mar. 15, 1921 |
| 1,576,321 | Gasser | Mar. 9, 1926 |
| 1,698,914 | Kircher | Jan. 15, 1929 |
| 1,925,265 | Mabey | Sept. 5, 1933 |
| 2,026,762 | Verner | Jan. 7, 1936 |
| 2,396,748 | Pitman | Mar. 19, 1946 |

FOREIGN PATENTS

| | | |
|---|---|---|
| 381,115 | Germany | Sept. 15, 1923 |